US009836701B2

(12) United States Patent
Chen et al.

(10) Patent No.: US 9,836,701 B2
(45) Date of Patent: Dec. 5, 2017

(54) DISTRIBUTED STAGE-WISE PARALLEL MACHINE LEARNING

(71) Applicant: Microsoft Corporation, Redmond, WA (US)

(72) Inventors: Weizhu Chen, Kirkland, WA (US); Wei Lin, Issaquah, WA (US); Jingren Zhou, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 555 days.

(21) Appl. No.: 14/458,963

(22) Filed: Aug. 13, 2014

(65) Prior Publication Data

US 2016/0048771 A1  Feb. 18, 2016

(51) Int. Cl.
*G06N 99/00* (2010.01)
*G06N 5/02* (2006.01)

(52) U.S. Cl.
CPC .......... *G06N 99/005* (2013.01); *G06N 5/025* (2013.01)

(58) Field of Classification Search
None
See application file for complete search history.

(56) References Cited

U.S. PATENT DOCUMENTS

| 6,230,151 B1 * | 5/2001 | Agrawal ................ G06F 8/453 706/12 |
| 8,306,940 B2 * | 11/2012 | Lee ...................... G06N 99/005 706/61 |
| 8,612,368 B2 | 12/2013 | Burdick et al. |
| 2008/0201280 A1 * | 8/2008 | Martin .................. G06Q 50/24 706/12 |
| 2010/0223213 A1 | 9/2010 | Su et al. |
| 2013/0290223 A1 | 10/2013 | Chapelle et al. |

OTHER PUBLICATIONS

"International Search Report & Written Opinion Issued in PCT Application No. PCT/US2015/044407", dated Feb. 1, 2016, 15 Pages.
Del Rio, et al., "On the Use of MapReduce for Imbalanced Big Data Using Random Forest", In the Journal of Information Sciences, vol. 285, Mar. 19, 2014, 26 Pages.
Fang, et al., "A Novel Prior-Based Real-Time Click Through Rate Prediction Model", In the International Journal of Machine Learning and Cybernetics, vol. 5, Issue 6, Jan. 12, 2014, 9 Pages.
Palit, et al., "Parallelized Boosting with Map-Reduce", In the Proceedings of the 2010 IEEE International Conference on Data Mining Workshops, Dec. 13, 2010, 8 Pages.
Panda, et al., "Planet: Massively Parallel Learning of Tree Ensembles with MapReduce", In Proceedings of the 35th International Conference on Very Large Data Bases (VLDB), Aug. 24, 2009, 12 Pages.

(Continued)

*Primary Examiner* — Alan Chen
(74) *Attorney, Agent, or Firm* — Fiala & Weaver P.L.L.C.

(57) ABSTRACT

A method for machine learning a data set in a data processing framework is disclosed. A forest is trained with the data set that generates a plurality of trees in parallel. Each tree includes leaf nodes having a constant weight. A discriminative value for each leaf node is learned with a supervised model. The forest is reconstructed with the discriminative values replacing the constant weight for each leaf node.

20 Claims, 3 Drawing Sheets

(56) References Cited

OTHER PUBLICATIONS

Agarwal, et al., "A Reliable Effective Terascale Linear Learning System", In the Journal of Machine Learning Research, vol. 15, Mar. 14, 2014, 23 Pages.
Wang, et al., "Research of Decision Tree on Yarn Using MapReduce and Spark", In the Proceedings of the 2014 International Conference on Advances in Big Data Analytics, Jul. 21, 2014, 7 Pages.
Wang, et al., "Scalable Subspace Logistic Regression Models for High Dimensional Data", Lecture Notes in Computer Science, Apr. 11, 2012, 10 Pages.
"Second Written Opinion Issued in PCT Application No. PCT/US2015/044407", dated Aug. 11, 2016, 8 Pages.
Schultery, et al., "Alternating Regression Forests for Object Detection and Pose Estimation", In IEEE International on Conference Computer Vision, Dec. 1, 2013, 8 pages.
Boehm, et al., "Hybrid Parallelization Strategies for Large-Scale Machine Learning in SystemML", In Proceedings of the VLDB Endowment, vol. 7, No. 7, Mar. 2014, pp. 553-564.
Ganjisaffar, et al., "Distributed Tuning of Machine Learning Algorithms using MapReduce Clusters", In Proceedings of the Third Workshop on Large Scale Data Mining: Theory and Applications, Aug. 21, 2013, 8 pages.
Lin, et al., "Large-Scale Machine Learning at Twitter", In Proceedings of the ACM SIGMOD International Conference on Management of Data, May 20, 2012, pp. 793-804.
Tuv, et al., "Feature Selection with Ensembles, Artificial Variables, and Redundancy Elimination", In Journal of Machine Learning Research, vol. 10, Jul. 2009, 26 pages.
Borkar, et al., "Declarative Systems for Large-Scale Machine Learning", In IEEE Computer Society Technical Committee on Data Engineering, vol. 32, Issue 2, Jun. 2012, 9 pages.
Basilico, et al., "Comet: A Recipe for Learning and Using Large Ensembles on Massive Data", In 11th IEEE International Conference on Data Mining, Dec. 11, 2011, 10 pages.
Chu, et al., "Map-Reduce for Machine Learning on Multicore", In Proceedings of the Twentieth Annual Conference on Neural Information Processing Systems, Dec. 4, 2006, 8 pages.
Breiman, Leo., "Random forests", In proceedings of Machine learning, vol. 45, Issue 1, Jan. 2001, 33 pages.
Johnson, et al., "Learning Nonlinear Functions Using Regularized Greedy Forest", In proceedings of arXiv:1109.0887, Oct. 12, 2013, 3 pages.
"Gradient boosting", Retrieved on: May 6, 2014 Available at: http://en.wikipedia.org/wiki/Gradient_boosted_trees#Gradient_tree_boosting.
Zhou, et al., "Scope: parallel databases meet MapReduce", In Journal of VLDB, Jun. 28, 2012, 26 pages.
"International Preliminary Report on Patentability Issued in PCT Application No. PCT/US2015/044407", dated Nov. 22, 2016, 9 Pages.

\* cited by examiner

DISTRIBUTED STAGE-WISE PARALLEL MACHINE LEARNING

BACKGROUND

Machine learning relates to systems that can learn from data, rather than merely follow explicit programmed instructions. Machine learning is employed in a range of computing tasks where designing and programming explicit rule-based algorithms is infeasible for a variety of reasons.

Supervised learning is a machine-learning task of inferring a function from labeled training data. A "teacher" provides example inputs and their desired outputs to a computing system, and the goal is to learn a general rule that maps inputs to outputs. Supervised learning algorithms are commonly described as performing the task of searching through a hypothesis space to find a suitable hypothesis that will make good predictions with a particular problem. Even if the hypothesis space contains hypotheses that are very well suited for a particular problem, a suitable hypothesis may be very difficult to find.

An ensemble is a supervised learning algorithm because it can be trained and used to make predictions. The trained ensemble represents a single hypothesis. Ensembles combine multiple hypotheses in the expectation of forming a better hypothesis, i.e., an ensemble is a technique for combining many weak learners in an attempt to produce a strong learner. Evaluating the prediction of an ensemble typically employs more computation than evaluating the prediction of a single model. Ensembles may be thought of as a way to compensate for poor learning algorithms by performing a lot of extra computation. Fast algorithms such as decision trees are commonly used with ensembles although slower algorithms can benefit from ensemble techniques as well. Random forests are an ensemble learning method for classification and regression that operate by constructing a multitude of decision trees at training time and outputting the class that is the mode of the classes output by individual trees.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Machine learning systems employing supervised learning algorithms can be adapted to run on data processing frameworks developed to run on distributed data storage and processing systems. Scaling machine learning systems to hundreds of millions or billions of examples of training data generally involves parallelizing the machine learning algorithms. Some machine learning systems are very difficult to parallelize and thus do not deliver results in a tolerable time span. Parallel machine learning algorithms with a non-linear predictive function using massive datasets can at times be inefficient and unreliable and thus deliver limited scalability and accuracy.

The disclosure relates to a method for machine learning a data set in a data processing framework. In one example, a forest is trained with the data set that generates a plurality of trees in parallel. Each tree includes leaf nodes having a constant weight. A discriminative value for each leaf node is learned with another supervised learning model, such as logistic regression. The forest is reconstructed with the discriminative values replacing the constant weight for each leaf node. In another example, new training data based on the data set used to train the forest is constructed and the discriminative values are learned from the new training data.

The disclosed machine learning process, unlike some accurate machine learning algorithms, is intrinsically parallelizable and can be applied over a massive volume of data to achieving a higher accuracy than current techniques commonly used in production.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
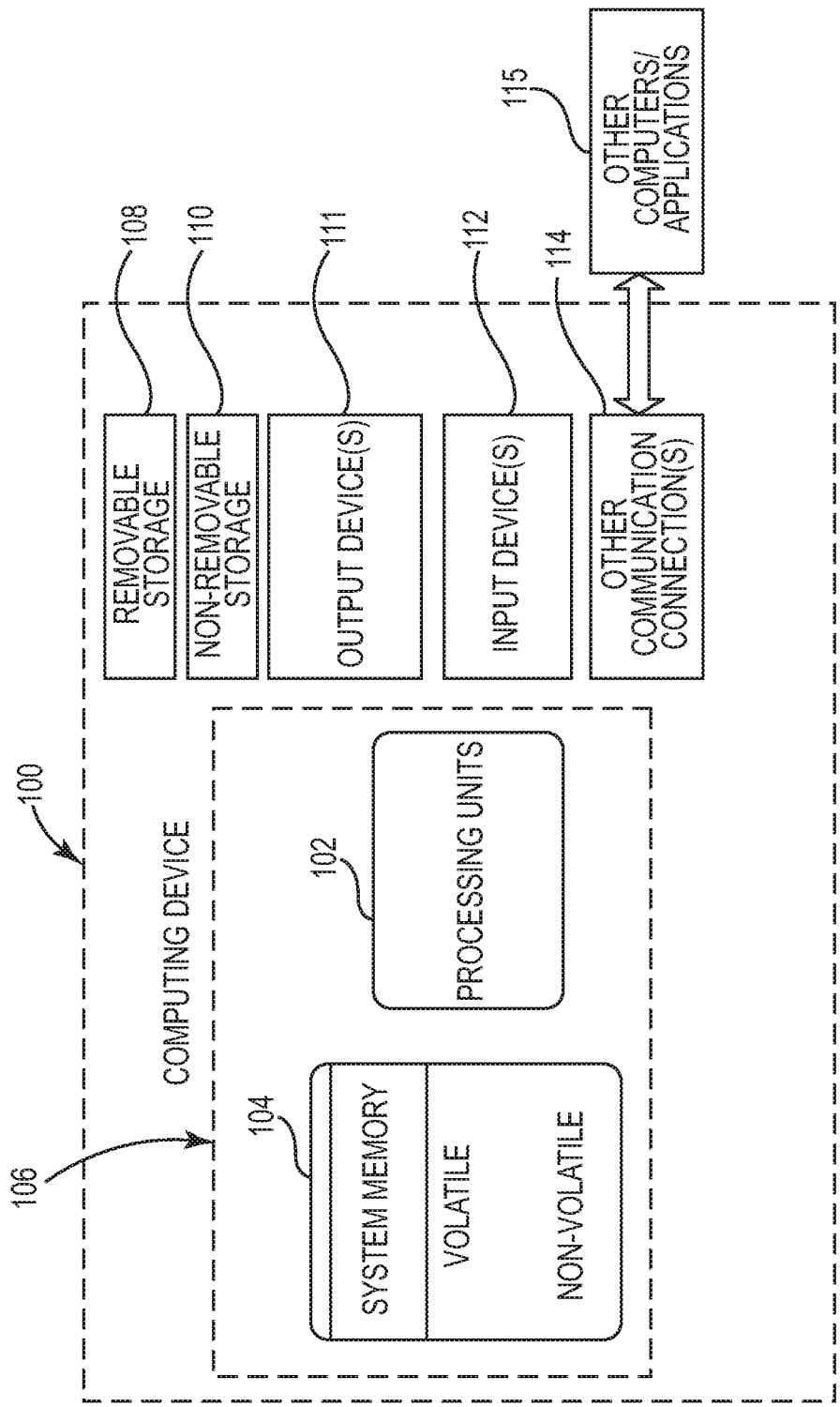
FIG. 1 is a block diagram illustrating an example of a computing device.

FIG. 1 illustrates an exemplary computer system that can be employed in an operating environment and used to develop, host, or run a computer application included on one or more computer readable storage mediums storing computer executable instructions for controlling the computer system, such as a computing device, to perform a process such as a machine learning algorithm.

The exemplary computer system includes a computing device, such as computing device 100. In a basic hardware configuration, computing device 100 typically includes a processor system having one or more processing units, i.e., processors 102, and memory 104. By way of example, the processing units may include, but are not limited to, two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network, computer cluster, cloud services infrastructure, or other.

Computing device 100 can also have additional features or functionality. For example, computing device 100 may also include additional storage. Such storage may be removable and/or non-removable and can include, but is not limited to, magnetic or optical disks or solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Computer storage media does not include a transitory propagating signal. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse), pen, voice input device, touch input device, or other. Output devices 111 may include devices such as a display, speakers, printer, or the like.

Computing device 100 often includes one or more communication connections 114 that allow computing device 100 to communicate with other computers/applications 115. Example communication connections can include, but are not limited to, an Ethernet interface, a wireless interface, a bus interface, a storage area network interface, a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Computing device 100 can be configured to run an operating system software program and one or more computer applications, which make up a system platform. A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a thread identifier, and a thread context, or thread state, until the thread is scheduled. A thread context includes the thread's set of machine registers, the kernel stack, a thread environmental block, and a user stack in the address space of the process corresponding with the thread. Threads can communicate with each other during processing through techniques such as message passing.

An operation may execute in a thread separate from the main application thread. When an application calls methods to perform an operation, the application can continue executing on its thread while the method performs its task. Concurrent programming for shared-memory multiprocessors can include the ability for multiple threads to access the same data. The shared-memory model is the most commonly deployed method of multithread communication. Multiple threads execute on multiple processors, multiple processor cores, multiple logical nodes in a single processor core, and/or other classes of parallelism that are attached to a memory shared between the processors.

Machine learning applications usually includes data sets with sizes beyond the ability of commonly used software tools running on a computer device 100 or a small network of connected computer devices 100 to capture, store, manage, and process the data within a tolerable elapsed time. Sizes of data sets are constantly increasing and currently range from a few dozen terabytes ($1000^4$ bytes) of data to many petabytes ($1000^5$ bytes) of data to exabytes ($1000^6$ bytes) of data in a single data set. Such data sets in machine learning systems can include hundreds of millions to billions of examples of training data. Web companies, in particular, have increasing needs to store and analyze the ever growing data, such as search logs, crawled web content, and click streams, usually in the range of petabytes, collected from a variety of web services. In order to manage such large amount of data, companies have developed distributed data storage and processing systems on large clusters of computer systems, which can include servers and portions of computing devices 100.

Figure 2:
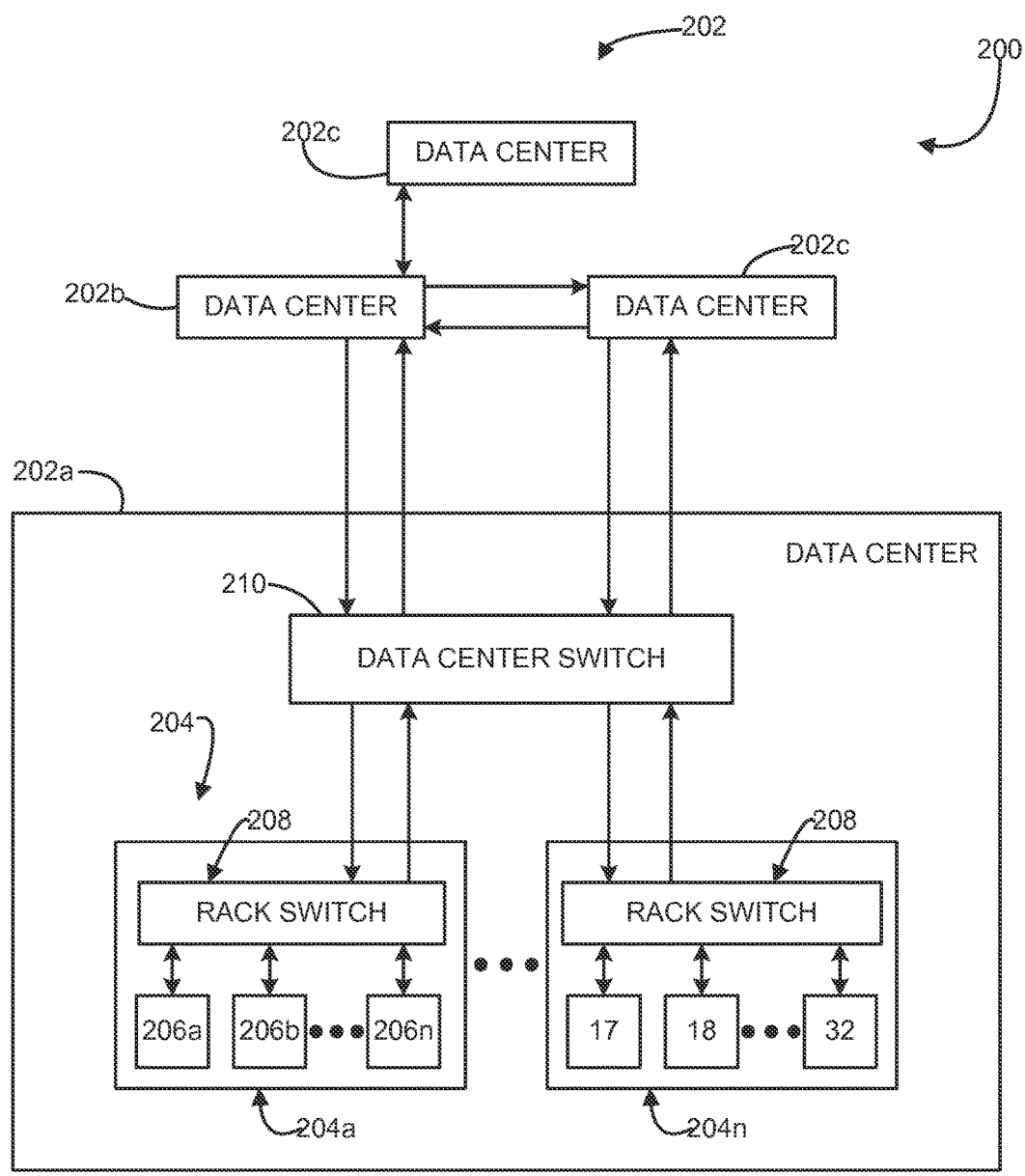
FIG. 2 is a block diagram illustrating an example distributed processing system that can include computing devices of FIG. 1.

FIG. 2 illustrates an exemplary distributed data storage and processing system 200 configured to execute a machine learning system with huge data sets. The illustrated layout of system 200 is merely exemplary may take on any other suitable layout or configuration. System 200 is used to store data, perform computational tasks, and transmit data between one or more datacenters 202, such as the four example datacenters 202a, 202b, 202c, 202d. Some of the datacenters 202 may be located geographically close to each other, and others may be located far from the other datacenters. The system 200 may include dedicated communication channels, as well as supporting hardware. In some embodiments, the network 200 includes one or more wide area networks (WANs) as well as multiple local area networks (LANs). System 200 utilizes a private network, i.e., the system and its interconnections are designed and operated exclusively for a particular company or customer, a public network such as the Internet, or a combination of both.

Referring to example datacenter 202a, the datacenters 202 can be coupled to one another through a datacenter switch 210. In some examples, each datacenter switch 210 includes multiple racks 204, such as 204a to 204n in datacenter 202a. Each rack can include one or more processing devices or processors 206 or such as a central processing unit, general-purpose graphical processing unit cores, and others. In some examples, the processors 206 within each rack 204 are interconnected to one another through a rack switch 208. Furthermore, all racks 204 within each datacenter 202 can also interconnected with a datacenter switch 210.

In this example, rack 204a includes processors 206a to 206n (worker processors 1-16) and rack 204n includes worker processors 17-32. The processors 206 can be coupled to other processors, local storage devices, network attached storage devices, and other computer-controlled devices that in some examples can be shared by more than one processor 206. In some embodiments, at least one of processors 206 operates as a master processor, and controls the scheduling and data distribution tasks performed throughout the network 200. In some embodiments, one or more processors 206 may take on one or more roles, such as a worker and/or a master processor. A rack can include storage (e.g., one or more network attached disks) that is shared by the one or more processors 206.

Several data processing frameworks have been developed to run on distributed data storage and processing systems such as system 200. Such large data processing frameworks includes parallel database systems, map-reduce environments, SCOPE, which are discussed below, and others. Computer programs can be developed or adapted for such frameworks to run on distributed data storage and processing systems. Frameworks provide a set of application-independent operators for reading input data and generating output data in many different programming languages. The operators can invoke library functions that handle data partitioning, parallelization of computations, fault tolerance and recovery, and input/output scheduling.

Parallel database systems feature data modeling using well-defined schemas, declarative query languages with high levels of abstraction, sophisticated query optimizers, and a rich run-time environment that supports efficient execution strategies. Parallel database systems typically run only on relatively expensive servers. Large data sets often employ hundreds or thousands of machines and thus parallel database solutions can become prohibitively expensive. Additionally, web data sets are usually non-relational or less structured and database solutions do not efficiently processing such semi-structured or unstructured data sets at scale.

Map-reduce type environments are frameworks adapted to run on large-scale, low cost, machines in distributed data storage and processing systems such as system 200. Example map-reduce type environments include MapReduce available from Google of Mountain View, Calif., Hadoop, an open source project of the Apache Software Foundation, as well as several others. These systems are designed to run on clusters of hundreds to tens of thousands of commodity, or relatively low cost, machines connected to a high-bandwidth network and expose a programming model that abstracts distributed group-by-aggregation operations. This programming model scales very well to massive data sets and has sophisticated mechanisms to achieve load balancing, outlier detection, and recovery from failures, among others. In order to implement the map-reduce environments, programmers translate business logic to the MapReduce model in order to achieve parallelism.

SCOPE (Structured Computations Optimized for Parallel Execution), available from Microsoft, Inc., of Redmond, Wash., is a type of hybrid environment that incorporates characteristics of parallel databases and map-reduce type environments and can be implemented in distributed data storage and processing systems such as system 200. SCOPE is computation platform for Microsoft online services targeted for large-scale data analysis and currently executes tens of thousands of jobs daily. SCOPE can be employed as an exabyte computation platform. Other suitable frameworks are contemplated.

Some machine learning systems employing supervised learning algorithms can be adapted to run on data processing frameworks developed to run on distributed data storage and processing systems such as system 200. Scaling machine learning systems to hundreds of millions or billions of examples of training data generally involves parallelizing the machine learning algorithms. Parallel machine learning algorithms with a non-linear predictive function using massive datasets can at times be inefficient and unreliable and thus deliver limited scalability and accuracy.

Such machine learning algorithms with non-linear predictive functions using massive datasets include forest-learning algorithms where a forest contains multiple trees. Examples of forest-learning algorithms include various techniques based on boosting regression trees, regularized greedy forests, and random forests, etc. Boosting regression trees and regularized greedy forests techniques employ a highly sequential approach are difficult to parallelize and are thus limited to applications with a small volume of training data. Random forests, which are highly parallelizable, can often not achieve an optimal accuracy.

A distributed stage-wise machine learning process or algorithm that can be applied as a parallel multi-stage weighted forest that addresses the limitations of other forest-learning algorithms processing large data sets. The machine learning process can be implemented as a set of computer readable instructions in a data processing framework configured to run on distributed data storage and processing systems such as system 200. The machine learning process disclosed—unlike techniques employing boosting regression trees and regularized greedy forests techniques—is intrinsically parallelizable and can be applied over a massive volume of data to achieving a higher accuracy than, for example, techniques using random forests.

Figure 3:
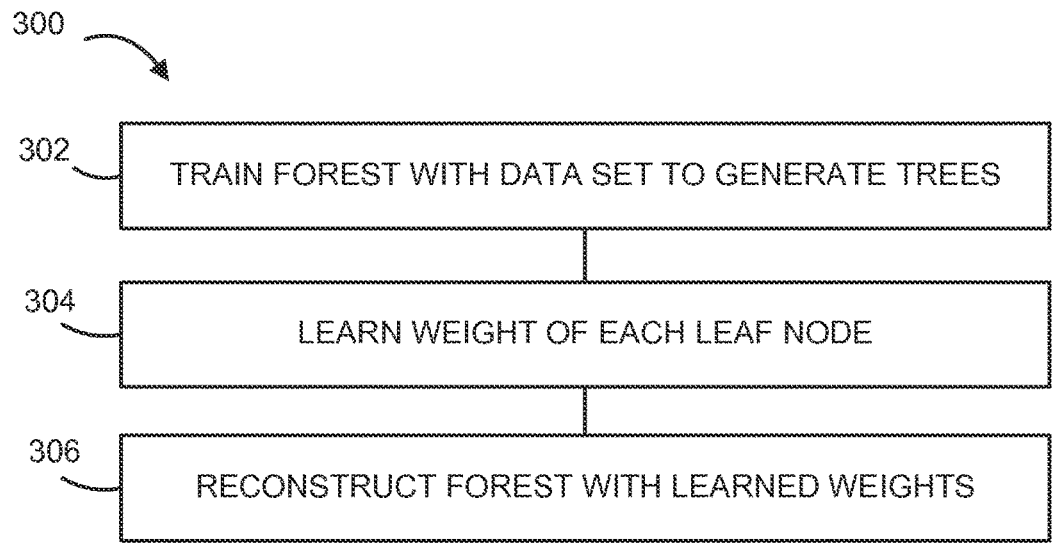
FIG. 3 is a block diagram illustrating an example method that can be executed with the distributed processing system of FIG. 2.

FIG. 3 illustrates an example stage-wise learning process 300 applied as a parallel multi-stage weighted forest that can be performed in parallel on the data system 200 with a massive scale of parallelism using a framework such as map-reduce type environment, SCOPE, or other framework. A forest is trained (or learned) with a data set, or training data, to generate a forest with multiple trees at 302. In one instance, the training data can includes hundreds of millions to billions of examples with thousands, or millions, of features. In one example, a random forest can be trained with original training data using a random forest algorithm. The forest contains multiple trees, and each tree comprises internal nodes and leaf nodes. While training the forest at 302, each leaf is given a constant weight; for instance, each leaf is assigned the value 1.0. Another supervised learning model model, such as logistic regression, is built to learn a weight for each leaf node for each tree in the forest in parallel at 304. The weight of each leaf node learned at 304 is adjusted to a discriminative value from the assumed constant weight of 302. The weight of each leaf node represents the significance attributed to the leaf node. Leaf nodes with less weight are less significant than leaf nodes with larger weights. The forest is reconstructed at 306 from leveraging the forest structure learned in 302 with the discriminative weights learned in 304 for each leaf node in the forest structure.

In one example, the stage-wise learning process 300 can be performed in a tolerable time span after breaking the process 300 into multiple stages, which can achieve bot high parallelism and convexity of the optimized problem. For example, each tree can be trained separately and in parallel with other trees to generate the forest at 302. The discriminative values can be determined at 304 from linear learning and can be performed in parallel using various parallel optimization methods.

For instance, a parallel optimization method to determine discriminative weights at 304 can include a linear model as the supervised learning model. Of course, a non-linear model could also be used, but the function to assign a weight for leaf node may be more complicated than for a linear model and introduce additional issues. In one example, logistic regression can be implemented parallel L-BFGS on SCOPE, which is a highly parallel optimization algorithm to solve various convex problems. Generally, the Broyden-Fletcher-Goldfarb-Shanno (BFGS) algorithm is an iterative method for solving unconstrained nonlinear optimization problems. Limited-memory BFGS (L-BFGS or LM-BFGS) is an optimization algorithm in the family of quasi-Newton methods that approximates the BFGS algorithm using a limited amount of computer memory and can be applied to parameter estimation in machine learning.

Process 300 provides a regularized approach that determines the significance of each leaf node generated at 302 by assigning weights from globally supervised learning at 304 and includes a convex loss function while random forests does not. The discriminative values introduce more complexity into the convexity property than other approaches so process 300 can potentially improve data characterization and accuracy. The leaning to determine the discriminative values at 304, in one example, is performed with a convex algorithm to provide a decrease of the loss function and an improved model over other approaches. Experimental results also demonstrated our algorithm provides a better accuracy than other processes such as random forests. Process 300 is also highly parallelizable and can massively scale, whereas processes such as regularized greedy forests and gradient boosting are not highly parallelizable because the algorithms are performed sequentially. In gradient boosting, for example, trees are trained sequentially, i.e., a first tree must complete training before a second tree can begin training, which makes parallelization difficult on a map-reduce environment.

Figure 4:
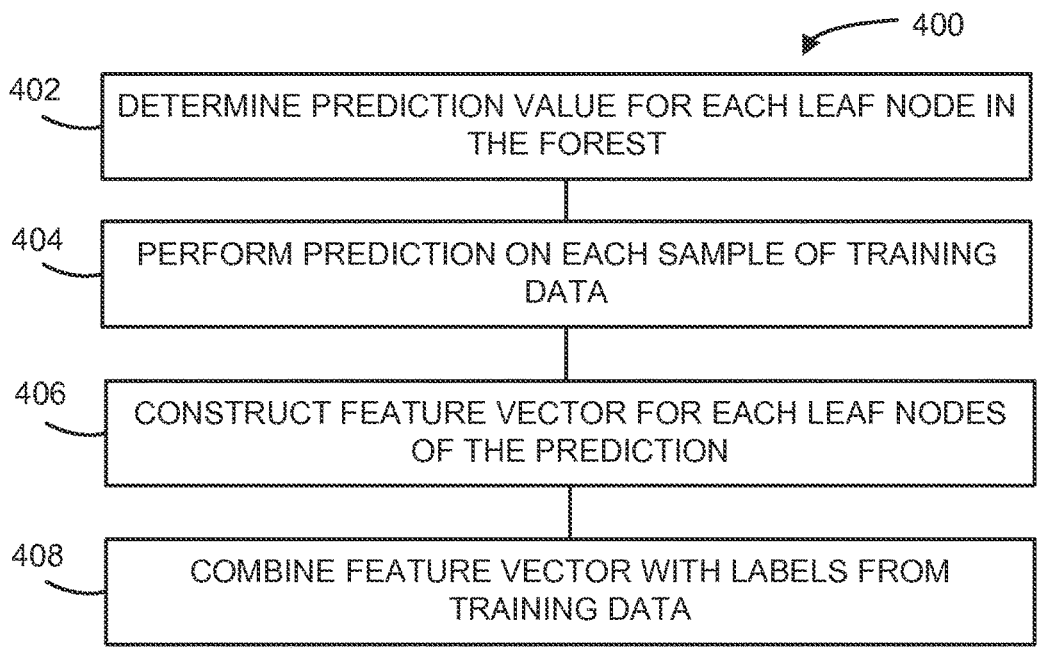
FIG. 4 is a block diagram illustrating an example method that can be executed with the distributed processing system of FIG. 2.

FIG. 4 illustrates an example process 400 for transitioning between training a forest at 302 to learning a weight of each leaf node at 304. Process 400 uses the original training data and the trained forest at 302 to construct new training data based on the original training data to learn the weight of each leaf node at 304. A prediction value for each leaf node in the forest is determined at 402. After training the forest at 302, each leaf node in the forest model includes a prediction value. Generally, the prediction value can be calculated from all the training data samples that classify (or belong) into each leaf node. For a decision tree used for regression, the prediction value is the average of regression values in all the training data samples belonging to this leaf node. The forest also performs a prediction on each original training data sample at 404. For each tree, the data samples will end in one leaf node, i.e., the leaf node determined from the prediction.

A feature vector is constructed from the prediction value and the corresponding leaf node determined from the prediction at 406. For instance, a forest with n trees can include a feature vector having length n for each original training data because each tree will contribute a single prediction leaf node with a corresponding value. The feature vector is combined with the labels of original training data at 408 to construct a new training sample for learning a weight of each leaf node at 304.

In one example, the feature vector is a sparse vector because one data sample belongs to one leaf node in a tree. Because the forest has n trees, where n is an integer greater than 1, a feature vector is constructed rather than a single leaf node. The number of non-zero features in the new training data for each data sample is equal to the number of trees, but the number of feature in the whole new training data is equal to the number of leaves in the original forest. Using the new training dataset, the weight for each feature is learned at 304. Each feature corresponds to a leaf node in the original forest so each leaf node in the forest is associated with a weight. By leveraging new training data developed in process 400 and the convex property in the learning algorithm used at 304 step 2, an optimal combination of these leaf nodes can be determined via learning weights. Each weight indicates the importance of its corresponding leaf node.

Process 400 is illustrated with an original training data including one million training samples having one thousand features. Using a random forest algorithm at 302, a forest includes three trees, and each tree has a depth of three, i.e., each tree includes three internal nodes and four leaf nodes. Leaf nodes in the first tree $t_1$ include $l_1, l_2, l_3, l_4$. Leaf nodes in the second tree $t_2$ include $l_5, l_6, l_7, l_8$. Leaf nodes in the third tree $t_3$ include $l_9, l_{10}, l_{11}, l_{12}$. Similarly, the prediction values for each leaf node can be denoted from $v_1$ to $vl_2$, respectively. After predictions are performed on each data sample, the prediction ends in one leaf node in each tree. For example, assume the sample goes to $l_2$ in $t_1$, $l_6$ in $t_2$, and $l_9$ in $t_3$. A feature vector thus includes $<(l_2, v_2), (l_6, v_6), (l_9, v_9)>$.

In addition to being intrinsically parallelizable and applicable over a massive volume of data to achieve higher accuracy, the stage-wise learning process 300 contains additional advantages over current algorithms. Among these advantages, two are described below.

The stage-wise learning process 300 can easily combine numeric and categorical features. The current forest-learning algorithms are designed to deal with numeric features and do not efficiently handle large-scale categorical features. Further, some linear model such as logistic regression or linear support vector machine—which can be used to learn the hybrid features having both numerical and categorical features—are not able to model the nonlinearity in the problem. The stage-wise learning process 300, however, can learn from the hybrid features and preserve the nonlinearity via the tree learning. Process 300 learns the nonlinearity of features by first building a forest containing multiple trees at 302. Each leaf in the tree or forest is treated as a nonlinear combination of previous feature. Non-linear features can be combined with other new features at 304. The hybrid features can be trained with a single uniform framework. In practice, such new features may come from categorical features or other encoded rule-based features.

Another advantage is the regularization. Process 300 can regularize the weights with any existing regularization technique, such as L1-norm and L2-norm. Current algorithms such as boosting regression tree or random forest can easily over-fit the training data, and this can lead to a poor accuracy in the prediction of testing data. Over-fitting is generally caused by the lack of regularization, which is addressed in process 300.

One example implementation of process 300 was developed as an application to be run on a SCOPE framework and implemented in distributed data storage and processing systems. This example implementation of process 300 was evaluated against other forest-learning algorithms for several issues to determine production metrics as applied several products and services available from Microsoft, Inc., including the BING web search or decision engine, OFFICE365 online productivity suite, and XBOX consoles and service.

One issue evaluated against other forest-learning algorithms relates to index selection. In this example, process 300 was implemented in an index selection application to choose approximately one hundred billion universal resource locators (URLs), or web addresses, from a URL repository including approximately ten trillion URLs. Only the chosen URLs were indexed for the search engine to serve user queries. In the example, the process 300 achieved a 0.5% gain over baseline if fifty billion URLs were selected and a 0.3% gain over baseline if 100 billion URLs were selected. Baseline was determined from an application implementing the boosting regression tree, which has been used in production for several years. In this example, the gains achieved with the process 300 are considered statistically significant due to the very large-scale of testing samples.

Another issue evaluated against forest-learning algorithms relates to click-through rate prediction. Click-through rate (CTR) is a way of measuring the success of an online advertising campaign for a particular website or the effectiveness of an email campaign by the number of users that clicked on a specific link. The production baseline algorithm is a neural network. In this example, the results of process 300 in click-through rate prediction were evaluated in terms of three production metrics, and the results from all three production metrics demonstrate process 300 can significantly beat the current baseline.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for machine learning a data set in a data processing framework, comprising:
   generating a forest comprising a plurality of trees that each include a plurality of leaf nodes, said generating based on initial training data that includes the data set, said generating including:
      generating the plurality of trees in parallel, and
      assigning a constant weight to each leaf node of the plurality of leaf nodes;
   constructing new training data based on the generated forest and the initial training data;
   determining a discriminative value for each of the plurality of leaf nodes in parallel based on the new training data to determine a plurality of discriminative values; and
   reconstructing the forest with the discriminative values replacing the constant weight for each of the plurality of leaf nodes.

2. The method of claim 1 wherein the initial training data includes over a hundred million of examples and over a thousand features.

3. The method of claim 1 wherein said generating a forest includes training with a random forest algorithm.

4. The method of claim 1 wherein said constructing comprises using a supervised model for learning the discriminative value that is a linear model.

5. The method of claim 1 wherein the discriminative value of the leaf node represents the significance of leaf node with respect to the other leaf nodes.

6. The method of claim 1 wherein the generating a forest, determining, and reconstructing are performed in sequence.

7. The method of claim 6 wherein each tree of the plurality of trees is generated separately.

8. The method of claim 6 wherein the discriminative values are determined from linear learning performed in parallel with a parallel optimization model.

9. The method of claim 8 wherein the parallel optimization model is a Limited memory Broyden-Fletcher-Goldfarb-Shanno algorithm.

10. The method of claim 6 wherein determining the discriminative values is performed with a convex algorithm.

11. A computer readable storage medium storing computer executable instructions for controlling a computing device to perform a method for machine learning a data set in a data processing framework, the method comprising:
   generating a forest comprising a plurality of trees that each include a plurality of leaf nodes, said generating based on initial training data including the data set, said generating including:
      generating the plurality of trees in parallel, and
      assigning a constant weight to each leaf node;
   constructing new training data based on the generated forest and the initial training data;
   determining a discriminative value for each of the plurality of leaf nodes in parallel based on the new training data to determine a plurality of discriminative values; and
   reconstructing the forest with the discriminative values replacing the constant weight for each of the plurality of leaf nodes.

12. The computer readable storage medium of claim 11 wherein the method is performed in a data processing framework configured to run on a distributed data storage and processing system.

13. The computer readable storage medium of claim 12 wherein the data processing framework is selected from a group of frameworks including a map-reduce type environment and a Structured Computations Optimized for Parallel Execution environment.

14. The computer readable storage medium of claim 11 comprising constructing new training data from the data set, and learning the discriminative value from the new training data.

15. The computer readable storage medium of claim 11 wherein the generating a forest, determining, and reconstructing are performed in sequence on the data processing framework.

16. The computer readable storage medium of claim 15 wherein each tree of the plurality of trees is generated separately on the data processing framework.

17. The computer readable storage medium of claim 15 wherein the discriminative values are determined from linear learning performed in parallel on the data processing framework.

18. A method for machine learning a data set in a data processing framework:
- generating a forest comprising a plurality of trees that each include a plurality of leaf nodes, said generating based on initial training data including the data set, said generating including:
  - generating the plurality of trees in parallel, and assigning a constant weight to each leaf node;
- constructing new training data including a linear model;
- determining a discriminative value from the new training data for each of the plurality of leaf nodes in parallel based on the new training data to determine a plurality of discriminative values; and
- reconstructing the forest with the discriminative values replacing the constant weight for each of the plurality of leaf nodes.

19. The method of claim 18, wherein constructing new training data includes determining a prediction value for each leaf node and performing a prediction on each example of the data set.

20. The method of claim 19 wherein a feature vector is constructed from each prediction value and corresponding leaf node, and the feature vector is combined with labels of the data set.

* * * * *